United States Patent [19]

Doty et al.

[11] Patent Number: 4,919,450
[45] Date of Patent: Apr. 24, 1990

[54] OVERT COMFORT SYSTEM

[75] Inventors: Gerald A. Doty, Crown Point, Ind.; Eric T. Johnson, Momence, Ill.

[73] Assignee: Occupant Safety Systems Inc., Olympia Fields, Ill.

[21] Appl. No.: 325,560

[22] Filed: Mar. 17, 1989

Related U.S. Application Data

[63] Continuation-in-part of Ser. No. 176,304, Mar. 31, 1988.

[51] Int. Cl.$^5$ .............................................. B60R 21/10
[52] U.S. Cl. .................................. 280/803; 280/806; 280/807
[58] Field of Search ............. 280/802, 803, 804, 806, 280/807; 297/464, 476, 477, 478; 242/107.4 R, 107.4 A, 107.4 B, 107.7; 335/234

[56] References Cited

U.S. PATENT DOCUMENTS

| 3,682,412 | 8/1972 | Kuszynski | 242/107.4 |
|---|---|---|---|
| 3,700,184 | 10/1972 | Francis | 242/107.4 |
| 3,834,646 | 9/1974 | Heath | 242/107.7 |
| 3,851,836 | 12/1974 | Sprecher | 242/107.7 |
| 3,869,098 | 3/1975 | Sprecher | 242/107.4 |
| 4,065,072 | 12/1977 | Magyar | 242/107.7 |
| 4,293,107 | 10/1981 | Ziv | 242/107.7 |
| 4,382,563 | 5/1983 | Morita et al. | 280/807 |
| 4,386,745 | 6/1983 | Patel et al. | 242/107.4 |
| 4,461,493 | 7/1984 | Doty | 280/807 |
| 4,498,689 | 2/1985 | Duffield et al. | 280/807 |
| 4,553,716 | 11/1985 | Honl | 242/107.7 |
| 4,585,185 | 4/1986 | Ueda | 242/107 |
| 4,603,877 | 8/1986 | Espinoza et al. | 280/807 |
| 4,669,751 | 6/1987 | Unger | 280/807 |

Primary Examiner—Kenneth R. Rice
Attorney, Agent, or Firm—Fitch, Even, Tabin & Flannery

[57] ABSTRACT

A seat belt retractor system for restraining a passenger in a vehicle is provided with a tension-relieving means engageable by a manual overt actuator, which system includes the following: initiation of the tensionless mode requires conscious actuation by the passenger; incorporation of an activated position, which allows retraction of any belt slack prior to engagement of the tensionless mode; subsequent slight belt protraction beyond the activated position engages the tensionless mode; a "memory" allowing belt protraction, less than a predetermined length, from the tensionless mode and return thereto; a means whereby belt protraction greater than the predetermined distance automatically returns the retractor and belt to the tensioned mode; and, an automatically operable actuator, which may be activated by the opening of the vehicle door for automatic return of the retractor to the belt-tensioned mode.

36 Claims, 6 Drawing Sheets

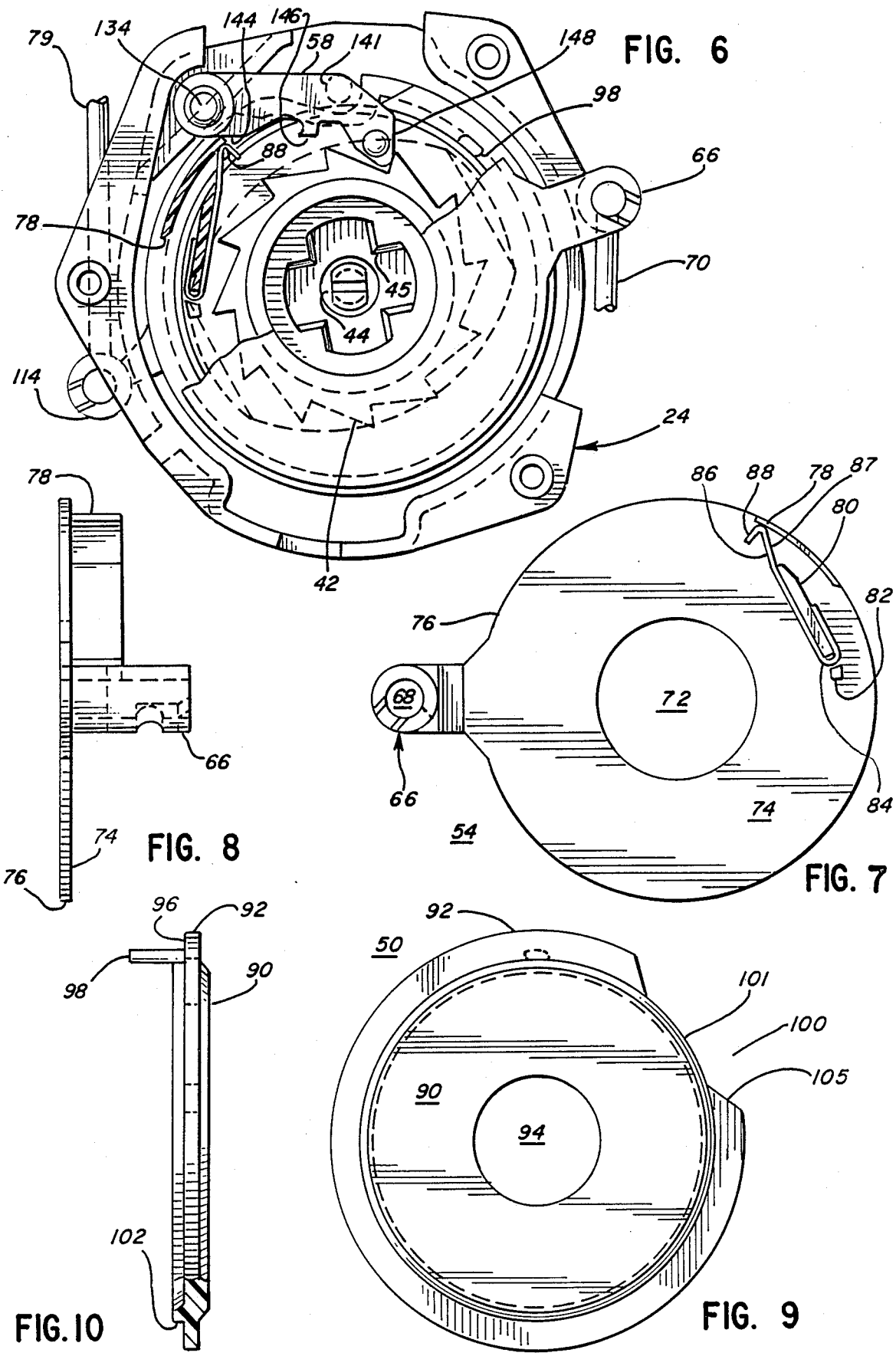

OVERT COMFORT SYSTEM

This is a continuation-in-part application of copending application Ser. No. 176,304, filed Mar. 31, 1988 now abandoned.

The invention relates to a safety belt system having a tension-relieving mechanism and more specifically to such a system in which the tension is relieved by a deliberate manual actuation of a control switch, lever or other actuator.

The usual tension-relieving mechanism is placed into the tensionless or comfort mode by the wearer having extended the seat belt about his torso and shoulder and then pulling the seat belt to further protract the belt, followed by a release of the belt for a slight belt rewind movement. This sequence causes an internal locking pawl to engage a ratchet wheel fixed to the reel shaft to prevent continued rewinding of the belt onto the reel under the force of the reel rewinding biasing means. Thus, a vehicle occupant's shoulder is relieved of the force of the rewind spring acting to rewind the shoulder belt. Such devices are shown in U.S. Pat. Nos. 3,851,836; 3,869,098 and 3,834,646. Conventional tensionless mechanisms generally have a memory system, which allows the occupant to move slightly forward to extract one or two inches of seat belt from the retractor without cancelling the tensionless mode. Thus, if the occupant moves rearward in his seat to the original tensionless position, the tension-relieving pawl again becomes engaged with the ratchet wheel to relieve the tension. Should the occupant extract more seat belt than the memory distance, the tension-relieving mechanism is automatically shifted to its ineffective or release position, causing the seat belt to tightly rewind against the occupant; or if the occupant opens the vehicle door, the seat belt rewinds to its fully wound position on the seat belt reel. That is, to assure that seat belts are fully wound upon an occupant's leaving the vehicle, a door-operated release means senses the opening of the door and shifts the tension-relieving mechanism to its release state, if it is already not there, thereby causing a rewind of the belt to its fully wound position on a reel.

In other overt or manual actuator systems for tension relieving, the system is set into its tensionless state by the occupant actuating a means such as a switch, which closes a circuit to operate a solenoid to shift the locking pawl into locking engagement with the ratchet wheel to immediately place the tensionless system into its tension-relieving state irrespective of occupant location. Thus, if one or more inches of slack are in the belt when the actuator is engaged, the amount of slack is not reduced even through the occupant may move back in the seat. Typically, such a tensionless system as disclosed in U.S. Pat. No. 4,585,185, can only be released by a subsequent electrical operation of a switch means. Manipulation of the belt beyond a memory distance will not cause an automatic rewind of the belt, as the solenoid has shifted the tension-relieving pawl into position and an electrical switch operation is required to shift the solenoid to another state, which shifts the pawl to its release position.

The present invention is directed to providing a manual overt actuator tensionless system requiring the operator to make a conscious decision to operate the actuator, which is usually in a switch or lever. The tensionless system is not immediately set into the tensionless state by a belt movement, but is moved to a set or activated position allowing a subsequent rewind of slack from the belt onto the reel, if the occupant is not already against the back of the seat, and requiring a subsequent slight protraction of the belt before it is set into the tension-relieving state. For instance, if the occupant is not fully seated against the seat back at the time of manual actuation of the actuator, the tensionless device is activated, but not locked in the tensionless mode, so that if the occupant moves rearwardly toward the seat back any slack is rewound from the shoulder belt to pull the belt tightly against the wearer's chest and shoulder. In order to shift from this activated position to the tensionless state, the occupant must protract additional belt, which is usually accomplished by grasping and slightly pulling the belt or by shifting one's shoulders forward. Unlike the above-described conventional systems, these belt manipulation steps will not initiate belt-tension relief without performing the first deliberate overt act of operating the manual actuator to set the system at its activated state. The present invention has the advantage of removing any inadvertent slack in the shoulder belt at the time of manual actuation of the overt manual actuator. As will be described herein, the present invention also provides a memory to return to the tensionless state if the belt is only protracted a short distance and then released. If the belt is protracted beyond the memory distance, the tensionless mechanism automatically is shifted into its release state allowing belt retraction. In addition, the tensionless mechanism may be released by another disengaging or operating means connected to a vehicle door, which means actuates rewinding of the seat belt automatically to its fully wound state upon opening the associated vehicle door.

Thus, the present invention provides a tensionless system that requires an overt actuation by the seat occupant of an actuator, followed by the usual belt manipulations to shift the tensionless mechanism to its tension-relieving state. Any slack in the shoulder belt is rewound between the time of actuation or movement to the activated state and a subsequent protraction of the belt to take slack out of the system before the mechanism is shifted to its tension-relieving position. In the tension-relieving position, a belt protraction beyond the short, predetermined memory distance results in disengagement of the tensionless device.

Because of the high volume of vehicle production and the multiple safety belt systems, a low cost and simple system is more desirable than a complex and expensive system. The present invention not only provides new and improved functions, but is also inexpensive to manufacture and small in size, which avoids interference with existing seat belt retractor placements.

SUMMARY OF THE INVENTION

The present invention provides a tensionless system for a seat belt retractor assembly. The system requires an overt, generally manual, activation of an actuator by a seat occupant, followed by belt manipulations to engage the tensionless or belt-tension relieving mechanism to the tensionless state or position. The mechanism, in the preferred embodiment, is initially slightly displaced to an activated state or position to allow any slack in the shoulder belt to be rewound prior to engagement of the tensionless position. Subsequent protraction of the belt transfers the belt to the tensionless state, which has a "memory", that is, protraction of the belt beyond the tensionless mode a short distance but less than a predetermined distance will allow the belt to return to the tensionless state. However, belt protraction beyond the predetermined distance will result in disengagement of the belt from the tensionless mode and reversion to the reference, that is belt-tensioned, mode.

The mechanism for the tensionless system is relatively compact and incorporates components which are easily manufactured and not subject to excessive wear. In addition, the assembly lends itself to adoption to a retractor assembly and has an easily operated overt manual actuator, as well as an automatic (door) operator. All of the above assets and attributes of the mechanism are in addition to the primary goal of providing a vehicle occupant with a safe seat belt retractor requiring a conscious act to engage the tensionless state, but limits the tensionless state to an acceptable range before an automatic return to the tensioned belt mode.

BRIEF DESCRIPTION OF THE DRAWINGS

In the Figures of the drawings, like reference numerals identify like components and in the drawings:

FIG. 6 is a plan view of the tension-relieving apparatus of FIG. 2 in the tensionless mode;

FIG. 7 is a plan view of the actuation disc of FIG. 4;

FIG. 8 is a side view of the actuation disc of FIG. 7;

FIG. 9 is a plan view of the lock-control disc of FIG. 4;

FIG. 10 is a side view of the lock-control disc of FIG. 9;

DETAILED DESCRIPTION OF THE PREFERRED EMBODIMENT

Figure 15:
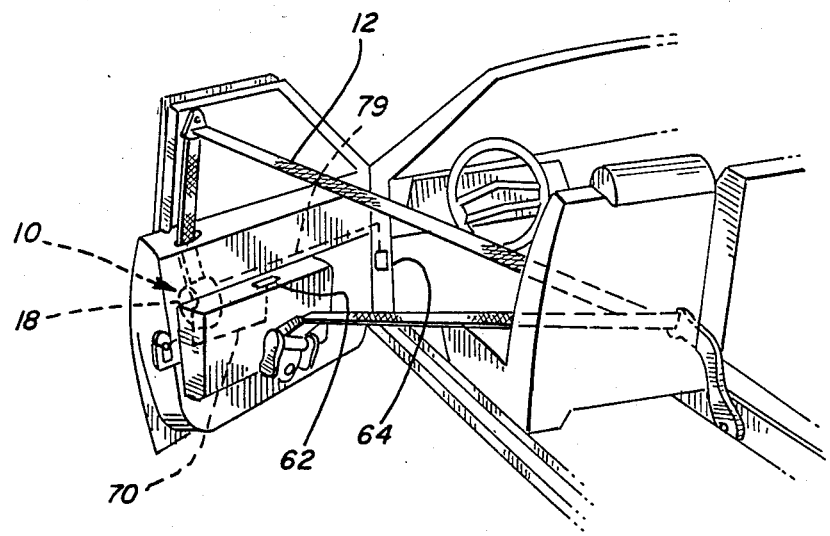
FIG. 15 is a diagrammatic illustration of a position of the remote automatic actuator of the present invention.

The present invention broadly relates to a seat belt retractor system generally utilized in automobile safety systems. More particularly, the invention provides a retractor having a manually-engageable tensionless or tension-relieving mode in the retractor system. In the drawings, FIG. 15 illustrates a door open position of the seat belt and shoulder harness arrangement.

Figure 1:
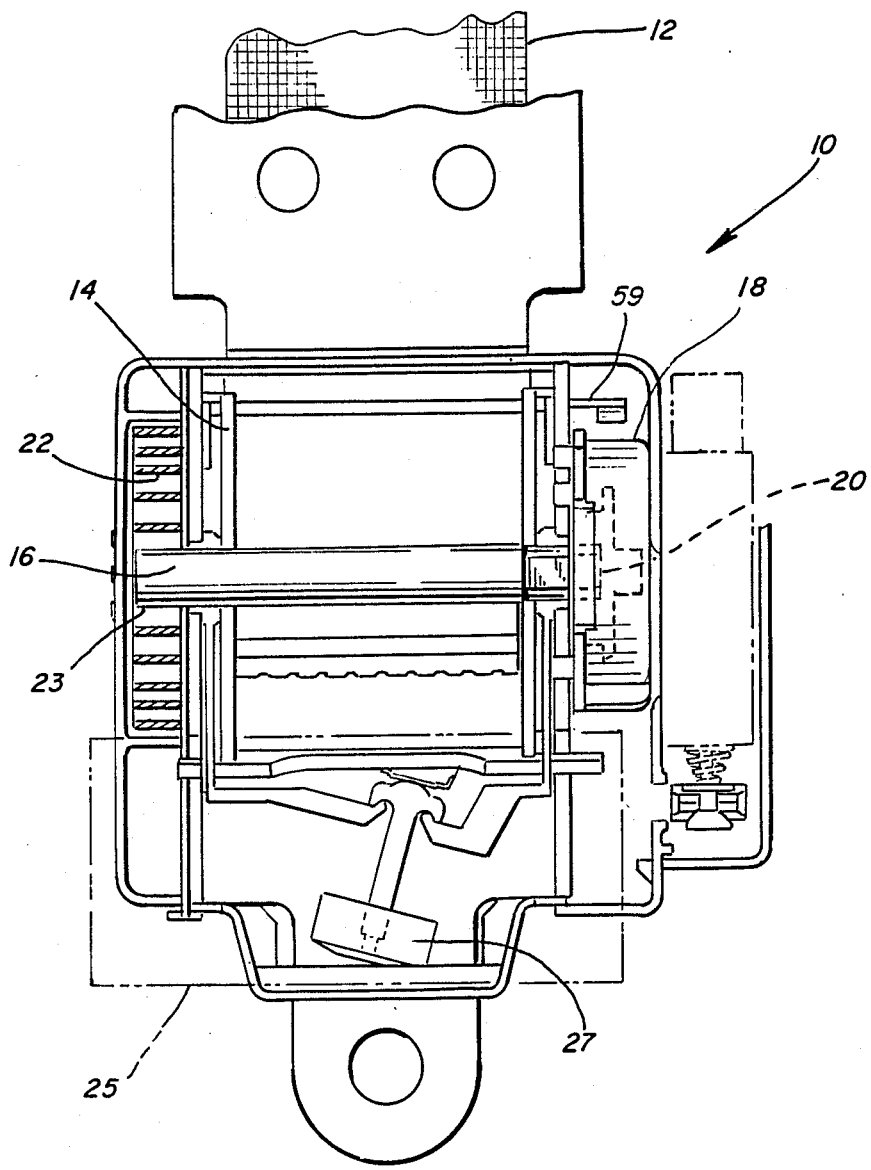
FIG. 1 is a plan view of a safety belt and belt retractor assembly.

As noted above, the present invention is directed to a seat belt retractor 10 such as shown in FIG. 1. Retractor 10 includes a belt 12 wound on a webbing reel 14 mounted on shaft 16, and a tensionless or tension-relieving means 18 mounted at one end 20 of shaft 16 for operation with reel 14. A rewind or biasing means or spring 22 is illustrated at the second or other end 23 of shaft 16, which spring 22 biases the reel 14 and belt 12 to the rewound position. The retractor assemblies for rewinding safety belts generally include an emergency locking mechanism 25, broadly shown in dashed outline, which may be of the inertia type operable by a pendulum weight 27 mounted on a support bar to actuate and lock the retractor mechanism against belt protraction during a vehicle accident or other sudden deceleration. A locking mechanism is illustrated and discussed in U.S. Pat. No. 4,361,294 at FIG. 1.

The tension-relieving means 18 is manually operated into the tension-relieving state or mode by operation of an overt manual actuator 62 which may be in the form of a button or lever positioned near the occupant to move a control cable 70 (FIG. 5) or may be in the form of a manually operated, electrical switch (not shown) to move a solenoid plunger to move an actuation or first member to shift the tension-relieving means 18 from its non-activated state. Heretofore, such manual overt actuation of an actuator, such as for a solenoid, caused the tensionless means to automatically engage irrespective of the position of the occupant relative to the seat back. If the occupant were forward in the seat, he would have to deactivate the tensionless means 18, remove the slack and then reactivate the tensionless switch means to obtain the desired tensionless position. Also, such systems often did not have a memory feature or a manual belt manipulation release, which could be activated by pulling the belt out beyond the memory distance.

In accordance with the present invention, the tension-relieving means 18 may be actuated by operation of the overt manual actuator 62, which shifts the tension-relieving means 18 to an activated or prime state allowing belt 12 to rewind and first remove any belt slack. A subsequent slight belt protraction automatically shifts the tension-relieving means into the tension-relieving position as shown in FIG. 6, with nose 148 of tension-relieving pawl 58 engaged with teeth 42 on ratchet wheel 40, which is fixed by fingers 45 to the reel shaft 16, to hold it against turning in the rewind direction (cf. arrow in FIG. 4) as urged by the reel spring 22. The tensionless means 18 has a memory position or state in which pawl 58 is held above the teeth 42 by a cam surface 92 on first rotatable member 50. So long as belt 12 is not protracted beyond the memory distance, pawl 58 will be returned into engagement with ratchet teeth 42 to reestablish the tension-relieving state. However, belt protraction beyond the memory distance causes tab means 98 to move into its detented or reference position with cam surface 92 on member 50 holding pawl 58 from engaging ratchet wheel 40, thus allowing belt 12 to rewind on reel 14. If the occupant opens the vehicle door while the tension-relieving means 18 is in the tensionless state, the remote door actuator 64, usually a plunger or a switch in the doorway, shifts an actuator cable or plunger 79 to shift member 38 to cam pawl 58 from engagement with teeth 42 on ratchet wheel 40, which allows belt 12 to fully rewind when the occupant leaves the vehicle.

Figure 3:
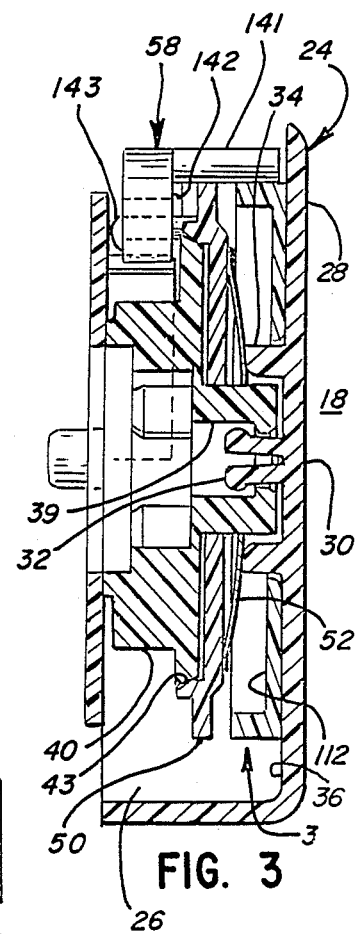
FIG. 3 is a cross-sectional view of FIG. 2 along the line 3—3.
Figure 4:
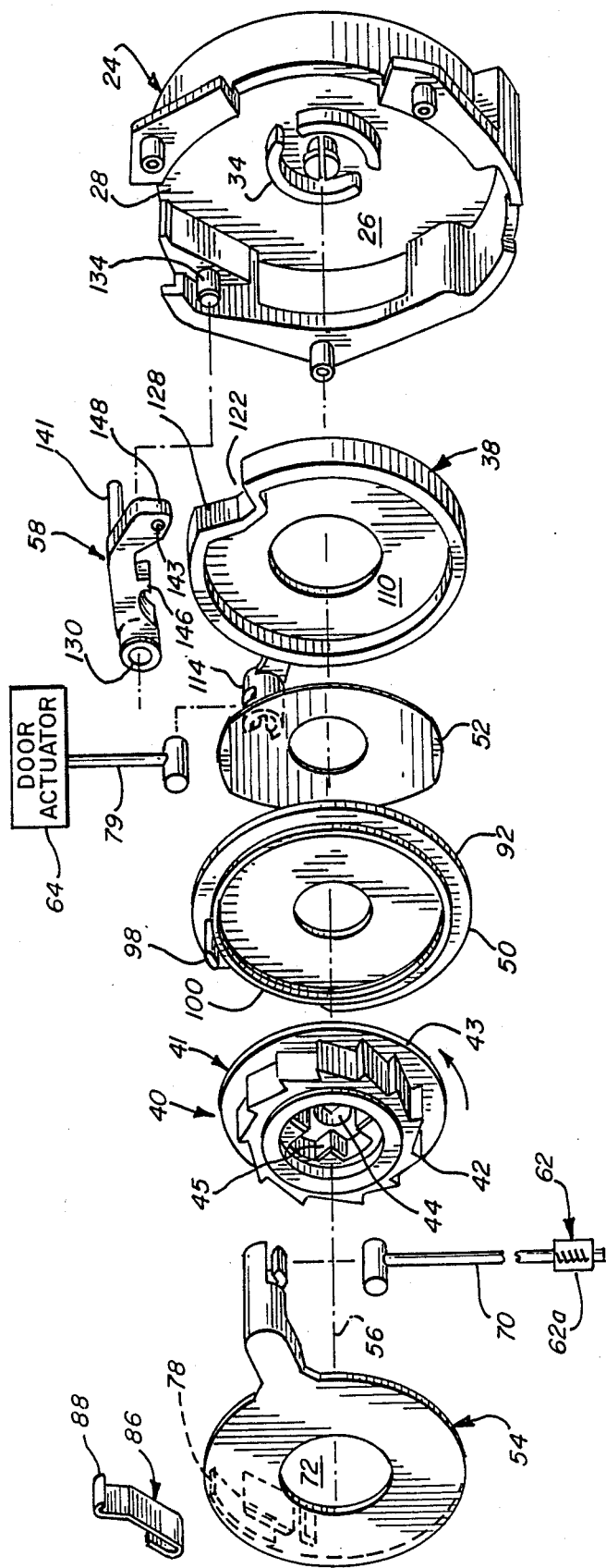
FIG. 4 is an exploded view of the assembly of FIG. 2.

The preferred embodiment of the present invention is illustrated in cross-section in FIG. 3 and in FIG. 4 in an exploded view. In these Figures tension-relieving means 18 has a housing or cover 24, which housing or cover is generally cup-shaped with a cavity 26 to receive the tensionless mechanism. Housing 24 is illustrated as circular-shaped, as an example and not a limitation, at cover face 28 and has a center location 30 with a central post 32 extending from inner surface 36 of cover 24 in cavity 26. Post 32 is concentric with a surrounding annulus 34, which also extends from inner surface 36 of cover 24 into cavity 26. Tensionless means 18 includes unlocking disc 38, which is mounted and operable on annulus 34. A ratchet member 40 with a plurality of ratchet teeth 42 and indentations has a bore 44 to receive post 32 for rotatable mounting thereon. Ratchet 40 is engageable with pawl or securing means 58 to secure the belt in the tensionless mode against the rewinding bias force of biasing means 22.

A lock control disc or first rotatable member 50 is mounted concentrically with ratchet 40 and is biased for frictional engagement with a flange 41 of ratchet 40 by a disc spring or washer 52 to maintain contact with the frictional surface of ratchet 40. An actuation disc 54 is concentrically mounted with lock control disc 50 and ratchet 40 along normal axis 56 through cover center 30 and is operable to engage or initiate the tensionless means 18 into the tensionless mode. The assembly 18 is engageable in the tensionless mode by actuating a first external or overt manual actuator 62 and is returnable to the reference mode by protraction of belt 12 by a predetermined distance. A second remote or disengaging apparatus 64 is also operable to disengage the retractor assembly from the tensionless mode, which remote disengaging apparatus 64 is generally operable by a vehicle door. That is, at door opening the door actuator or disengagement apparatus 64 is operable with unlocking disc 38 to disengage the tensionless mode, thereby allowing retractor assembly 10 to rewind belt 12 at belt disengagement.

The following description will describe the noted tensionless means 18 in greater detail. Tensionless apparatus 18 is illustrated in FIG. 4 in an exploded view, as well as in FIGS. 7 through 17 wherein several of the elements noted in FIG. 4 are illustrated in detail. In FIG. 7, actuation disc 54 is shown in plan view as a generally annular shape with surface or face 74, a central bore or passage 72, and a protuberance or lug 66 extending radially outward from the disc circumference 76. Lug 66 has bore 68 to receive a connecting means or cable 70 communicating between actuation disc 54 and remote engagement apparatus or manual overt actuator 62. As shown in FIG. 4, overt actuator 62 has a push button to move coupling means 70 and actuator 54.

A first rib 78 is generally arc-shaped and mounted or positioned along circumference 76 of disc 54. A second rib 80 and third rib 82 are mounted on face or surface 74 and have a gap 84 therebetween. A retention spring or reference-establishing spring 86 with protuberance 88 is mounted on second and third ribs 80 and 82 with protuberance 88 extending to contact first rib 78. In FIG. 8, actuation disc 54 is shown in a side view wherein the lug 66 extends from and is perpendicular to surface 74, with through-bore 68 therein. In addition, the displacement or width of first rib 78 from surface 74 is clearly noted therein.

Lock-control disc or first rotatable member 50 is illustrated in FIGS. 9 and 10 with front surface 90, a circumference 92, a central bore 94, and a back surface 96. Disc 50 has a tab means 98 which extends normally from back surface 96, and slot or window 100 along circumference 92, which may be an arc-shaped slot. An annular wall 102 extends from back surface 96 for frictional engagement and travel with a contact surface or flange 41 of ratchet 40. Window 100, as further disclosed below, defines the limits of the tensionless mode per se. The "memory" of apparatus 18 will restore the tensionless mode for extensions of belt 12 beyond the tensionless mode, but less than the predetermined length required to reestablish belt tension in the reference mode. The combination of the tensionless mode and the memory cooperate to define the comfort system of the tension-relieving means 18. However, it is understood that the range of the tensionless mode may vary from a tensionless mode with no slack, that is no tensionless belt distance, up to any segment of the memory prior to reengagement of the reference position.

Figure 12:
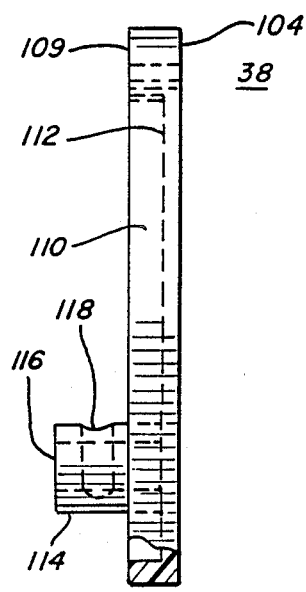
FIG. 12 is a side view of the unlocking disc in FIG. 10.
Figure 11:
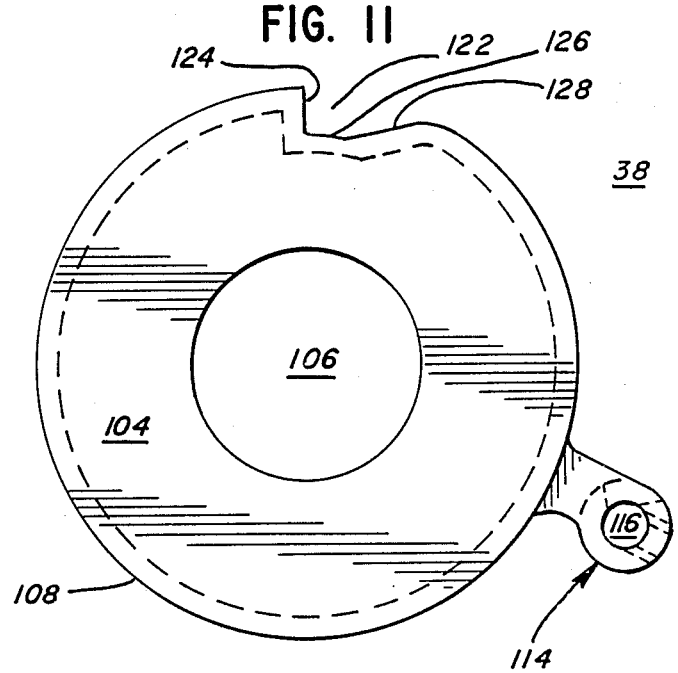
FIG. 11 is a plan view of the unlocking disc of FIG. 4.
Figure 14:
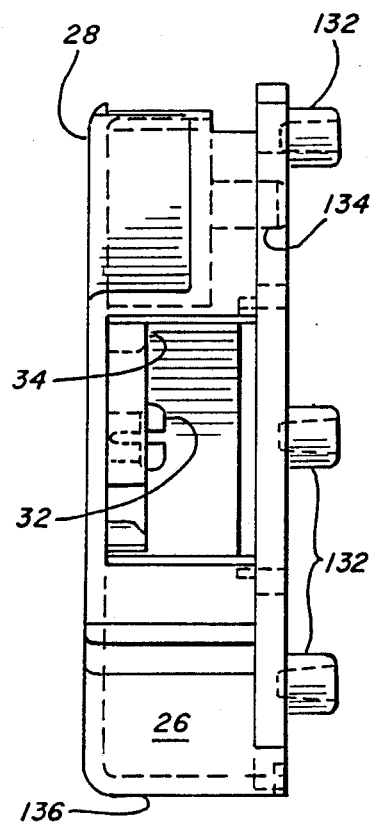
FIG. 14 is a side view of the housing shown in FIG. 13.

Unlocking disc 38, shown in FIGS. 11 and 12, is generally annular-shaped with a circumference 108, an outer surface 104, and a central through-bore 106. Disc 38 has a sidewall 109 cooperating with inner surface 112 to define cavity 110.

In FIG. 12, a second lug 114 projects from surface 112 generally normally thereto and has a through-bore 116 in the longitudinal direction with an intersecting blind-hole cross-bore 118 intersecting bore 116. Second lug 114 is coupled to and operable with external disengaging means 64 by coupling means 79 (cf. FIG. 4), which means 64 may be a button or switch operable by an automobile door during its opening and closing. Disc 38 includes a groove or slot 122 at its circumference 108, which groove 122 has a shoulder 124, a base 126 and a sloped ramp 128 communicating from base 126 to circumference 108. Slot 122 is operable to receive an extending member 141 of securing means 58, thus allowing engagement of tension-relieving means 18. Unlocking disc 38 is actuated at door opening by remote disengaging means 64, which disc 38 pivotally moves the securing means 58 from inhibiting belt retraction. The typical remote disengagement comprises a spring-biased plunger mounted on the doorframe, which plunger is actuated by the door closing to shift the plunger and push a cable 79 to turn disc 38 to position the slot 122 on the disc to allow tensionless pawl 58 to be effective. Opening the door allows the spring-biased plunger to extend and thus pull cable 79, which turns disc 38 clockwise to allow camming surface 128 on one side of slot 122 to abut pawl post 141 and pivot pawl 58 upwardly where it can no longer engage ratchet teeth 42. Thus, the remote disengagement means 64 moves or rotates disc 38 to the tensionless disengagement position, disengages securing means 58 from ratchet 40, and returns belt 12 to the tension state for rewinding on reel 14. The remote disengagement means could be an electrical switch open and closed by the door to operate a solenoid to shift the disc 38.

Figure 13:
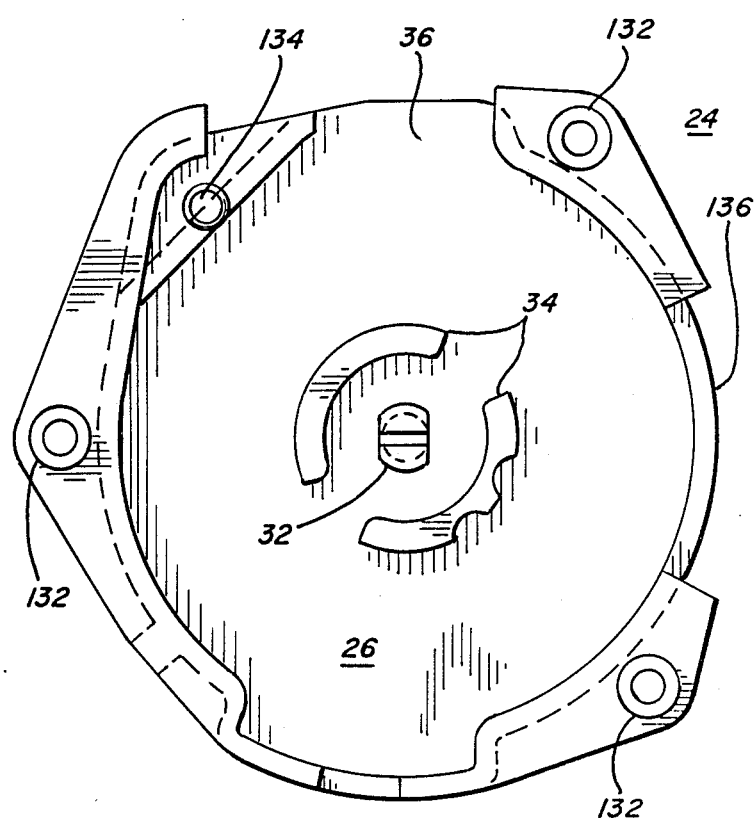
FIG. 13 is a plan view of the housing of FIG. 4.

Cover or housing 24 is illustrated in plan view in FIG. 13 with annulus or annulus members 34 and post 32 extending from inner surface 36. Cover 24 is generally cup-shaped and includes a plurality of mounting lugs 132 and a projecting mounting post stud 134. Sidewall 136 cooperates with inner surface 36 to define cavity 26, which is generally operable to receive the assembly comprising tensionless or tension-relieving means 18.

Securing means 58 in FIG. 4 is a pawl for engagement with ratchet teeth 42 or engagement in ratchet grooves of ratchet 40. Pawl 58 is a shown as a dogleg shape with a through-bore 130 at one end to receive mounting post 134 and pawl 58 is pivotable or rotatable thereon. A stud 141 extends generally normally from rear face 142 of pawl 58, and a locking shoulder or protruding member 146 extends from lower contour 144 of pawl 58. Pawl 58 includes locating bead 143 for maintaining pawl 58 aligned on stud 134.

In operation, tension-relieving assembly 18 includes: a means for securing the belt in a reference and tensioned position; means for transferring or communicating the tensionless means to a set or activated position; and provides a range of tensionless operation for the belt retractor assembly 10. The tensionless operation or comfort zone is provided over a predetermined range defined or responsive to protraction of belt 12, that is, as an example, a range of 3 to 4 inches of protraction of belt 12, where the tensionless mode may be any portion thereof. Belt protraction beyond the predetermined range will move the tensionless assembly from the tensionless mode to the reference position and a belt-tensioned mode. Protraction of the belt 12 a distance less than the above-noted predetermined range will maintain belt 12 in the tensionless mode, or more specifically, the belt will return to the tensionless mode from the extended or protracted state.

As illustrated in FIG. 3, the assembly has ratchet 40 with hub 39 which is seated within annulus 34. As noted above, ratchet 40 includes a sprocket with a plurality of teeth 42 engageable with pawl 58, which pawl 58 will restrain rewinding action of reel 14 by retention of the ratchet 40. In the assembly, disc spring 52 is mounted against annulus 34 and about sprocket hub 39 to bias the lock control disc 50 against the friction surface 43 of ratchet flange 41. Therefore, lock control disc 50 is normally biased to move and rotate with ratchet 40, which ratchet is mounted on shaft 16 with fingers 45 and rotatable with shaft 16.

In the initial or reference position the tensionless device is released and is not activated. In this position, the door-operated unlocking disc 38 has its groove 122 positioned beneath the stud 141 on pawl 58. In this initial position, the reel spring is tensioning the belt. The lock control disc 50 is positioned with tab means 98 in the detent between extending member 88 of spring clip 86 and locking shoulder 146 extending from lower contoured surface 144 of pawl 58. In this configuration, tab 98 is constrained between the protruding member 88 and shoulder 146, and pawl 58 is cammed from contact with ratchet teeth 42 to maintain belt 12 in a tensioned state.

Figure 2:
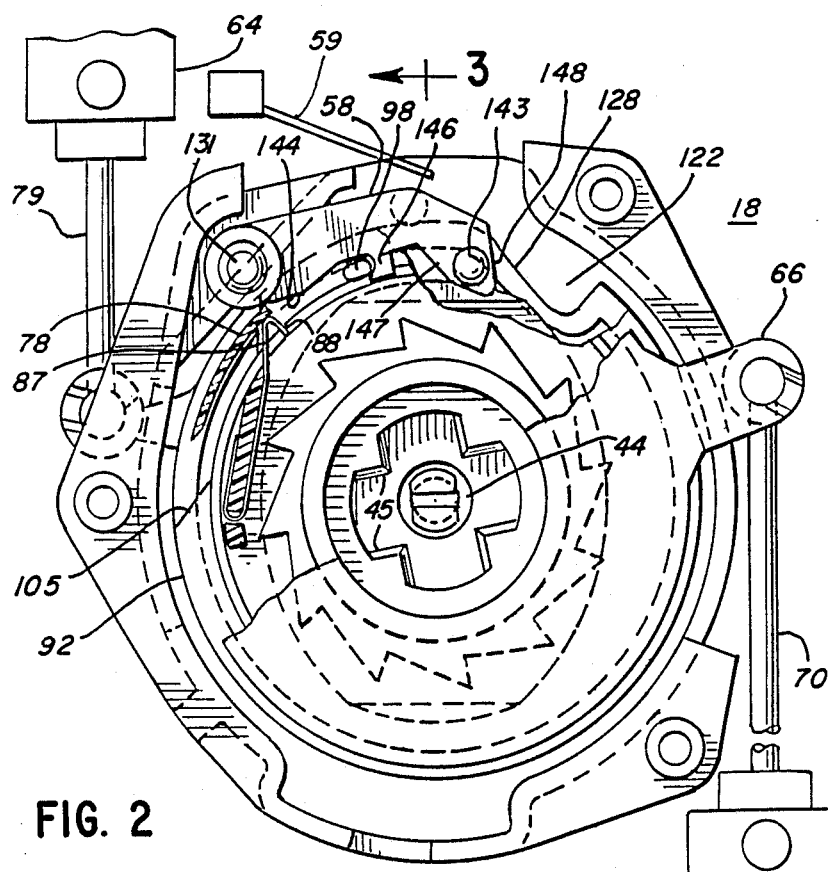
FIG. 2 is a plan view of the preferred embodiment of the tension-relieving apparatus for the retractor assembly in the reference position.
Figure 5:
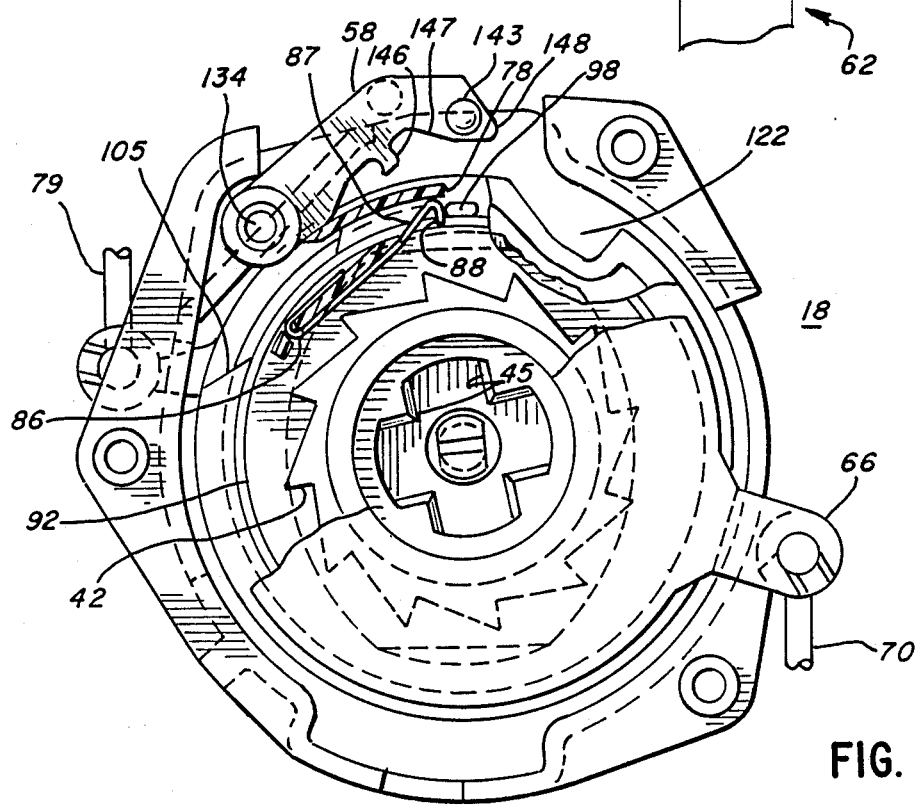
FIG. 5 is a plan view of the tension-relieving apparatus of FIG. 2 in the activated position.

The tensionless mode may be initiated by operation of manual overt actuator 62 to pull cable 70 to turn actuation disc 54 in a generally clockwise rotation about shaft 16 in FIGS. 2, 5 and 6 to bring first rib 78 into engagement with lower contour 144 of pawl 58 to pivot it about mounting post 134, which moves shoulder 146 from its detenting position. First rib 78 on actuation disc 54 continues to rotate in a clockwise rotation, as shown in FIG. 5, until protruding member 88 of spring clip 86 contacts tab means 98 on lock control disc 50 and drives it, and thereby rotates the lock control disc 50 to position the tab 98 at the second or activated position between locking shoulder 146 and the end 148 of pawl 58. In the activated mode, any excess belt slack, as when the occupant is not against the seat back, may be rewound prior to moving disc 50 and tension-relieving means 18 to the tensionless mode. With tab 98 in the activated position between shoulder 146 and cam surface 147 on the underside of pawl 58, a rewind of the belt causes control disc 50 to turn slightly counterclockwise because it is frictionally clutched to the ratchet wheel, but tab 98 abuts shoulder 146 and holds the control disc against following the ratchet wheel. When the operator releases the manual actuator 62, a spring 62a (FIG. 4) in the actuator pushes the cable 70 upwardly as viewed in FIG. 4 to rotate the actuator disc 54 counterclockwise and return actuator disc 54 to its initial position as shown in FIG. 5. This return movement of actuator disc 54 returns first rib 78 from its position of contacting and lifting pawl 58 to the position where first rib 78 no longer engages pawl 58 and concomitantly detent member 88 is returned to position for a subsequent detenting operation.

After the slack has been removed and while in the activated state, a slight protraction of belt 12 will move tab 98 against pawl cam surface 147 and pivot pawl 58 upwardly on mounting post 134; rotate window 100 into alignment with groove 122; and, move tab 98 beyond pawl end 148. Thus, lock control window 100 is positioned to receive the pawl post or stud 141. Pawl 58 is gravitationally pivoted about post 134 to nest stud 141 into the window 100 and slot 122, which engages pawl end 148 and one of the ratchet teeth 42 of ratchet 40, as shown in FIG. 6. This contact between pawl end 148 and ratchet teeth 42 will prohibit or inhibit rewinding of belt 12 on reel 14. Belt 12 will continue to be allowed to protract through the rotation or rotational arc of lock control disc 50. However, when tab means 98 contacts inclined cam surface 87 on spring protrusion 88, it will deflect it radially inwardly and continue to rotate clockwise to hit shoulder 146, and thus tab 98 will again be in the detent between member 88 and shoulder 146, and pawl 58 will be cammed on member 50 and displaced from engagement with ratchet teeth 42, which will return the belt and reel or retractor assembly to the tensioned mode and reference position.

The tensionless state is defined by nesting stud 141 in groove 122 and window 100 for engagement of pawl end 148 with ratchet teeth 42. However, protraction of belt 12, which continues to move ratchet 40 and first rotatable member 50 in unison, beyond this range, does not reengage the reference mode until tab 98 displaces spring protrusion 88 and enters the detent. For belt 12 protraction which does not move tab 98 far enough to reenter the detent, bias means 22 acts to rewind belt 12 and reposition window 100 in alignment with groove 122 to permit stud 141 to again nest therein for pawl 58 engagement with ratchet 40, thus reestablishing the tensionless mode.

In FIGS. 4 and 9, first rotatable member 50 has a generally circular shape with an arc-distance window 100 at its circumference 92. As noted above, the tensionless mode per se is defined where window 100 is in alignment with groove 122 of automatically operable actuator or unlocking disc 38, which window 100 and groove 122 are aligned to receive pawl stud 141 for pawl end 148 engagement with ratchet teeth 42 for securing reel 14 from rewinding belt 12. With the vehicle door closed, groove 122 is aligned and is not movable until the vehicle door is opened to activate automatic operator 64 to rotate unlocking disc 38.

Belt 12 in the tensionless mode, that is with pawl stud 141 nested in window 100 and groove 122, includes a "memory." That is, belt 12 may be protracted a short distance, such as three to four inches, and thereafter returned to the tensionless setting. The memory position is engaged by protraction of belt 12, which in FIGS. 2, 5 and 6 is a clockwise rotation of ratchet 40 and first rotational member 50. This rotary motion of first rotational member 50 moves pawl stud 141 along inner arc surface 101 of window 100, up ramp 105 to again contact circumference 92, which disengages pawl 58 from ratchet teeth 42 and enables bias means 22 to again apply a biasing or tensioning force to belt 12. Protraction of belt 12 up to a predetermined distance and subsequent restoration of the tensionless mode, the above-noted three to four inches, is allowed by the contact of pawl stud 141 with and along circumference 92, and the subsequent release of belt 12 before displacement of spring protuberance 88 from contact with first rib 78. That is, for belt protraction less than the predetermined distance, pawl stud 141 movement on circumference 92 on disc 50, which is biased by spring 22, will retrace itself back to the tensionless setting with window 100 aligned with groove 122 and stud 141 nested therein. Thus, travel of pawl stud 141 on circumference 92 without repositioning tab 98 in the detent will operate as the "memory" or memory distance. As noted above, travel beyond the predetermined distance will deflect spring protuberance 88 radially inwardly and allow the tab 98 to rotate clockwise past the protuberance and reposition tab 98 in the detent between protuberance 88 and pawl shoulder 146 with pawl 58 disengaged from ratchet 40 and maintained in that position by pawl stud 141 contact with circumference 92 of first rotational member 50.

In the event that belt 12 protraction is forcefully protracted and is displaced from rapid pivotal return to any of the reference, activated or tensionless positions, a third bias means 59 is provided for pawl 58 displacement limitation and its rapid return to its operating position. Third bias means 59 is illustrated in FIG. 1 as a leaf spring connected to retractor assembly 10 and generally situated above tension-relieving means 18. In FIG. 2, leaf spring 59 is noted as extending over pawl 58, and any movement that tends to throw the pawl 58 outwardly causes the pawl to engage and deflect the spring 59, which is then energized to force the pawl downwardly to assure that pawl 58 is situated to reengage ratchet 40 or to secure tab 98 in the activated position.

At occupant egress from the vehicle with belt 12 and tension-relieving means 18 in the tensionless position, door opening actuates door actuator 64 to move connecting means 79, which is coupled to lug 114, to rotate the automatically-operable actuator 38 about annulus 34. Rotation of automatic actuator 38 in a clockwise direction, as shown in FIG. 5, will move stud 141 of pawl 58 along ramp 128 to outer surface 108 by pivoting pawl 58 about projecting arm 134. Thus, pawl 58 is disengaged from ratchet 40, which allows bias means 22 to urge reel 14 to rewind belt 12 uninhibited by pawl 58 and belt 12 will again be at its tensioned state. Although opening of the vehicle door and actuation of the automatic actuator 38 will not necessarily return the belt to the reference state in the detent, belt 12 will rewind on reel 14 at belt unbuckling as pawl 58 remains disengaged from ratchet 40 with pawl stud 141 on cam surface 108 until the vehicle door is closed. Closure of the vehicle door will rotate automatic actuator 38 and groove 122 to the reference position awaiting alignment of window 100 therewith for receipt of pawl stud 141. Thereafter, subsequent protraction of belt 12 will reset the reference state. This reference position will again require the conscious act of engaging manual overt actuator 62 to initiate the tensionless mode.

In accordance with an important feature of the invention, the amount of slack occurring during the shifting into the tensionless mode may be reduced from one inch or more with conventional systems such as shown in U.S. Pat. Nos. 3,851,836; 3,869,098; and 3,834,646 to one-half inch or less. That is, the present invention allows a reduction of one-half or more of the amount of slack between the occupant's body and the belt from the above patented conventional systems, which have a memory or comfort feature and a belt pull to place the device in the tensionless mode. To this end, the actuator disc may be altered to the shape shown in FIG. 16 with stud 141 of pawl 58 positioned adjacent or on the edge of the window 100 in the cam surface 92 (FIG. 16) when the tensionless device is in the activated state, so that upon the occupant pulling the belt, the stud 141 on pawl 58 will immediately slide downwardly along sloped surface 205a into window 100 as the disc 50 is rotated clockwise from the activated position where tab 98 is between depending detent projection 146 and cam surface 147 on the underside of pawl 58. The control disc 50 shown in FIG. 16 differs only from the disc 50 shown in FIG. 9 in the location of the window 100 and the sloped surfaces leading thereto relative to the tab 98. The sloped surfaces 205 and 205a of control disc 50 in FIG. 16 correspond to the sloped surfaces 105 and 105a in FIG. 9. As will be explained, the more rapid positioning of the pawl nose with the arrangement in FIG. 16 results in less slack in the system than with conventional systems as the first tooth of the ratchet is engaged and returned to after belt protraction from the activated state.

Figure 16:
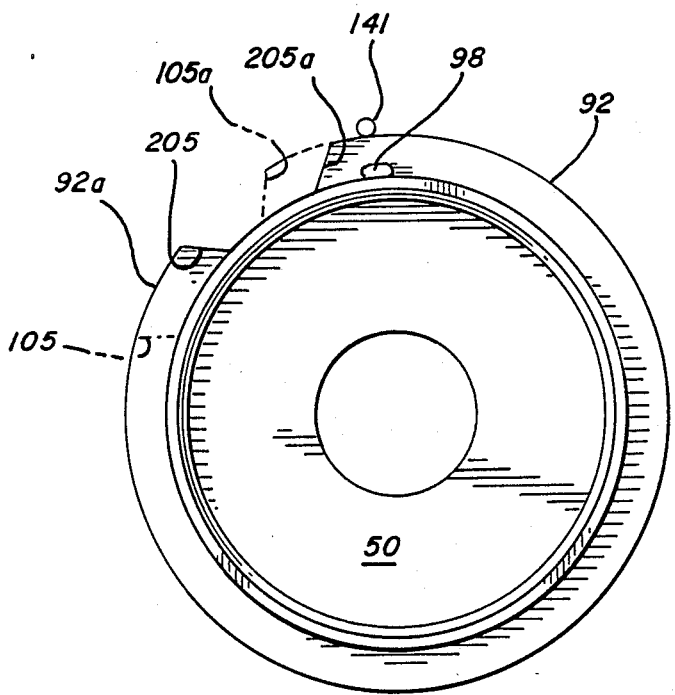
FIG. 16 is a side view of the alternative embodiment of the lock-control disc.

As the tab 98 clears pawl nose 148 upon belt protraction, the leading sloped surface 205a of the window 100 is located below the pawl stud 141 so that as the belt continues to be protracted, stud 141 drops into window 100 and pawl nose 148 engages the first tooth on the ratchet wheel to establish the tensionless position with a minimal belt protraction, i.e., the pawl engages the first available tooth. Continued belt protraction by the occupant beyond that need to lower the pawl nose into the ratchet, causes the lock control disc 50 to continue to rotate clockwise as shown in FIG. 5, which brings inclined surface 205 on disc 50 to engage the stud 141 and to lift the pawl nose with the stud 141 then riding on the cam surface 92. When the occupant releases the belt for rewind, the reel rewind spring turns the reel and the ratchet 40 in the counterclockwise direction whereby belt slack is rewound in this memory position until the pawl stud 141 begins to slide down the inclined surface 205, thereby again lowering the pawl nose into the tooth of the ratchet wheel to reestablish the tensionless position. The location of sloped surfaces 205 and 205a for the control disc relative to the tab 98 is shown in FIG. 16. Because the inclined surface 105a is spaced farther from the tab 98 than inclined surface 205a, the pawl in FIG. 16 drops down sooner to take out belt slack; but because there is an additional arcuate cam surface sector 92a on the memory side of the cam 92 between inclined surface 205 and the dotted line 105, the memory for the control disc 54a of FIG. 16 will be longer than the memory for the control disc 54 (FIG. 9) by this distance, for control discs of the same diameter.

It is appreciated, that direct engagement of the tensionless mode is also attainable by protraction of belt 12 moving tab 98 and window 100 into position for engagement of the tensionless mode after engagement of overt manual actuator 62.

As used herein, the term "tensionless" is used to mean not only the condition in which all of the belt tension from the reel return spring is relieved from the occupant's shoulder, but also the condition in which the major portion of the belt tension is relieved and some slight spring force may be still present.

While only specific embodiments of the invention have been described and shown, it is apparent that various alterations and modifications can be made therein. It is, therefore, the intention in the appended claims to cover all such modifications and alterations as may fall within the scope and spirit of the invention.

What is claimed is:

1. In a seat belt retractor for rewinding a seat belt,
   a biasing means for biasing a reel to retract and to rewind the belt on the reel,
   an emergency locking means for locking the belt against protraction at the time of an accident,
   a tension-relieving means for relieving a tension force applied by the belt onto the body of an occupant in a vehicle by blocking belt retraction and rewinding movement of the reel when the tension-relieving means is in a tension-relieving position,
   a manual overt actuator for shifting the tension-relieving means to an activated state for allowing belt retraction to remove slack by rewinding the belt onto the reel prior to a subsequent seat belt protraction to position the tension-relieving means in a tensionless state at the tension-relieving position, and
   means operable by belt protraction beyond a predetermined distance to shift the tension-relieving means from its tension relieving position to its ineffective release position allowing the biasing means to rewind the belt onto the reel.

2. The combination of claim 1 including a means in said tension-relieving means for allowing the tension-relieving means to return to its initial tension-relieving position after short belt extensions less than the predetermined distance.

3. The combination of claim 1 in which the tension-relieving means comprises a first rotatable member actuated by said manual overt actuator to shift from a reference position to an activated position to allow belt retraction to remove slack, said first rotatable member rotatable with a subsequent belt protraction to a tension-relieving position.

4. The combination of claim 3 including a pawl and ratchet means in the tension-relieving means with the ratchet connected to the reel to turn therewith until engaged by the pawl, the first rotatable member holding the pawl in the activated position to allow belt retraction to remove slack and the first rotatable member allowing the pawl to engage the ratchet wheel when the first rotatable member shifts to the tension-relieving position.

5. The combination of claim 4 in which the first rotatable member comprises a disc rotatable by frictional engagement with the ratchet, and
   detent means are provided to detent the first rotatable member at the reference position until shifted therefrom by the manual overt actuator.

6. A combination in accordance with claim 5 in which the detent means comprises a tab on the rotatable member and a protruding member to engage the tab and to hold the first rotatable member at the reference position until said first rotatable member is shifted by the manual overt actuator to the activated position.

7. A combination as claimed in claim 5 further comprising a second biasing means to bias said first rotatable member to frictional engagement with said ratchet.

8. A combination as claimed in claim 6 where said protruding member is affixed to said pawl and operable therewith to maintain said first rotatable member in the reference position.

9. A combination as claimed in claim 4 further comprising a housing, which housing has an inner surface and a sidewall to define a generally cup-shaped cavity to receive said tension-relieving means;
   said housing having a mounting stud extending therefrom;
   said pawl having a protruding member and defining a bore, and pivotably mounted on said mounting stud through said bore;
   said first rotatable member having a tab, said tab operable to engage said protruding member to maintain said first rotatable member in said reference position until said first rotatable member is shifted by the manual overt actuator to the activated position.

10. The combination as claimed in claim 4 wherein said tension-relieving means further comprises an automatically-operable actuator coupled to the first actuating means and operable to disengage said tension-relieving means from said tension-relieving position.

11. The combination as claimed in claim 10 wherein said vehicle has at least one door, a remote actuating device operable by opening said door, said automatic actuator coupled to and operable by said remote actuating device at said door opening to disengage said tension-relieving means from said tensionless position.

12. The combination as claimed in claim 6 in which a first rib is provided on said actuator disc to contact and displace said pawl, said detent means including a deflectable member on the actuator disc to drive the tab in one direction of disc movement and to be deflected by the tab with disc movement in the opposite direction.

13. The combination as claimed in claim 12, and further comprising a second rib and a third rib mounted on said first actuator means and defining a gap therebetween;
   said spring means mounted and secured on said second and third ribs and extending therefrom to contact said first rib;
   said pawl having a protruding member to contact said tab;
   said spring projecting member cooperating with said pawl protruding member to define the detent therebetween.

14. An automotive seat belt retractor assembly for rewinding a seat belt for securing a vehicle occupant, which vehicle has at least one door
   said assembly having a reel for rewinding said belt thereon,
   a first biasing means for biasing the reel to retract and rewind the belt on the reel,
   an emergency locking means for locking the belt against protraction at the time of an accident,
   a tension-relieving means having a tensionless position for relieving a tension force applied by the belt, which tension-relieving means comprises:
   a manual overt actuator operable by a seat occupant to shift into an activated state to allow belt rewind;
   a ratchet means coupled to and operable with said reel;
   a pawl means for engaging and securing said ratchet means against belt rewinding on said reel;
   a rotatable actuation member movable by the manual overt actuator;

a rotatable lock control member operable by said rotatable actuation member to shift the latter from a detent position in which the belt is tensioned and the pawl means is disengaged from the ratchet means, to an activated position allowing belt rewind to remove slack from the belt;

said rotatable lock control member movable with subsequent protraction from its activated position to its tensionless position allowing the pawl means to engage the ratchet means to position the tension-relieving means in the tensionless position;

a memory cam on the lock control member for holding pawl means from the ratchet means for a limited predetermined belt protraction and for return to the tensionless position; and, detent means for detenting the lock control member in its detented position with belt protraction beyond the predetermined belt protraction, said lock control member having means thereon to disengage the pawl means from the ratchet means to allow belt tension on the occupant.

15. The combination of claim 14 in which said lock control member and said actuation member are rotatable discs mounted to turn about an axis through the ratchet means.

16. An automotive seat belt retractor assembly as claimed in claim 15 wherein said ratchet means has a central hub with a passage and fingers therein, a plurality of teeth with indentations, a bearing surface operable to engage said first actuation means for sliding contact therewith, and a flange for frictional engagement with said first rotatable member.

17. An automotive seat belt retractor assembly as claimed in claim 16 wherein said first rotatable member has a body with a front surface, a back surface, a central passage therethrough, and a periphery with a window defined along said periphery;

a sidewall extending from said front surface and operable to contact said ratchet flange;

a tab extending from said first rotatable member front surface;

said first rotatable member mounted and rotatable on said ratchet hub.

18. An automotive seat belt retractor assembly as claimed in claim 17 wherein said second biasing means is a disc spring defining a generally central through-bore, which disc spring is mounted on said hub, contacts said rotatable member back surface and biases said rotatable member to engage said ratchet flange.

19. An automotive seat belt retractor assembly as claimed in claim 17 further comprising a projecting pawl stud mounted on said pawl;

said automatically operable actuation means having a body with a perimeter and defining a generally centrally positioned through-bore in said body and a groove in said body perimeter operable to receive said pawl stud, which groove includes a base, a shoulder and a sloped ramp surface extending from said base to said body perimeter;

said groove alignable with said first rotatable member window at said tensionless position to receive said pawl stud.

20. An automatic seat belt retractor assembly as claimed in claim 19 wherein said automatic actuation means further comprises a coupling lug with a through-bore therethrough;

a remote means for engaging, which remote means is operable at the opening of said door;

a second coupling means connected between said remote means for engaging and said second coupling lug to move said automatic actuation means to disengage said tension-relieving means and allow said belt to rewind on said reel.

21. An automatic seat belt retractor assembly as claimed in claim 20 further comprising a tension-relieving means housing with an inner face and a sidewall cooperating to define a cavity, a first mounting post generally centered in said cavity and extending from said inner face, a generally annular wall mounted on said inner face about said first mounting post, and a first mounting stud generally extending from said inner face;

said automatic actuation means mounted on said annulus and rotatable thereon;

said first rotatable member having a tab means extending therefrom;

said ratchet means with the first rotatable member and second biasing means thereon mounted and rotatable on said first mounting post, said second biasing mean contacting said annulus;

said first actuating means in proximity to said ratchet bearing surface;

said pawl pivotably mounted on said first mounting stud to engage said ratchet teeth to inhibit retraction of said belt in said tensionless mode.

22. An automatic seat belt retractor assembly as claimed in claim 21 further comprising a protruding member mounted on and extending from said pawl to contact and restrict said rotatable member tab means in a detent.

23. An automatic seat belt retractor assembly as claimed in claim 22 further comprising a first rib, a second rib and a third rib mounted on and operable with said first actuation means;

a spring clip with an extending end, said spring clip mounted and secured on said second and third ribs with the extending end contacting said first rib and cooperating with said pawl-mounted protruding member to define a detent for said tab means with said belt in said reference position, said first rib operable to contact and pivotally displace said pawl and pawl protruding member at manual actuator engagement and said spring clip end operable to contact and move said tab to said activated position.

24. An automatic seat belt retractor assembly as claimed in claim 23 and further comprising a shaft, said reel mounted on said shaft, which shaft extends from said reel; and said ratchet drivingly mounted on said shaft.

25. A belt tension-relieving means for a seat belt retractor assembly, which retractor assembly has a seat belt on a reel for protraction and retraction therefrom, said seat belt operable in a vehicle to secure an occupant therein, said retractor assembly having a biasing means for biasing the reel to retract and rewind the belt on the reel, and an emergency locking means for locking the belt against protraction;

said tension-relieving means operable to relieve a tensioning force applied by the belt to said occupant by inhibiting belt retraction and rewinding on said reel, which tension-relieving means is operable from a reference position at said tension applied position of said belt to an activated position and a tensionless position;

said tension-relieving means comprising:

a manual overt actuator for shifting he tension-relieving means to one of an activated state and a tensionless position from said reference position;

a first means for actuating with a first body and a generally centrally-positioned bore therethrough;

a ratchet having a bearing surface, a plurality of teeth with indentations, a central hub with a bore, fingers projecting from said hub into said bore, and a flange;

a first rotatable member having a body with a perimeter, a wall extending from said body, a tab, a window at said perimeter and a central bore therethrough;

a second biasing means;

an automatically operable actuator having an actuator central bore, an actuator periphery defining a groove at said periphery with a shoulder, a base and a sloped ramp extending between said base and periphery;

a pawl with a mounting bore therethrough;

a housing having an inner surface and a sidewall cooperating to define a cup-shaped cavity, an annular member generally centrally mounted on said face in said cavity, a first mounting stud in said annulus, and a second mounting stud extending from said inner face with said pawl pivotally mounted thereon;

said automatically operable actuator mounted in said cavity on said annular member;

said first rotatable member mounted and rotatable on said ratchet hub for frictional engagement between said rotatable member extending wall and said ratchet flange, said second biasing means mounted on said hub to bias said rotatable member against said ratchet flange, said ratchet hub mounted on said housing first stud and rotatable thereon;

means for coupling;

said coupling means operably connecting said first actuator means and said manual overt actuator for actuation thereby;

said first actuator means contacting said bearing surface and operable to move said pawl and engage said tab to move said first rotatable member to said activated position.

26. The combination as claimed in claim 2 wherein the tension-relieving means comprises a first rotatable member and first actuator means actuated by said manual overt actuator to shift said tension-relieving means from a reference position to an activated position.

27. The combination as claimed in claim 26 further comprising a pawl and a ratchet means, said ratchet connected to said reel to turn therewith, the first rotatable member operable to hold the pawl in the reference position to allow belt retraction and said pawl operable to engage and restrain the ratchet wheel when the first rotatable member shifts to the tension-relieving position.

28. The combination as claimed in claim 27 wherein the first rotatable member is a disc rotatable by frictional engagement with the ratchet and further comprising a detent; a tab means mounted on said rotatable member, said tab means retained in said detent at the reference position until shifted therefrom by actuation of said manual actuator.

29. The combination as claimed in claim 28 further comprising a housing, which defines a cavity; said first actuator having an arm coupled to and operable by said manual actuator to move said first actuator to displace said pawl and to shift said first rotatable member and tab means to the activated position.

30. The combination as claimed in claim 29 wherein said tension-relieving means further comprises an automatically operable actuator operable to disengage said tension-relieving means from said tensionless position for rewinding said belt on said reel.

31. An automatic seat belt retractor assembly as claimed in claim 24 and further comprising a third bias means, which third bias means is positioned and operable to contact said pawl.

32. An automatic seat belt retractor assembly as claimed in claim 30 and further comprising a third bias means positioned and operable to contact said pawl at pawl arc displacement above a predetermined arc distance.

33. A method of providing a tensionless seat belt about the shoulder of an occupant with a tensionless device mounted on a retractor comprising the steps of:

moving a manual overt actuator by the occupant to shift the tensionless device into an activated position;

rewinding any slack between the occupant's body and belt after moving the manual actuator;

pulling on the seat belt to protract the belt and to shift the tensionless device from the activated position to a tensionless state upon release of the belt;

pulling the belt for less than a predetermined memory distance when in the tensionless state with the tensionless device returning to the tensionless state; and pulling the belt for a distance greater that the predetermined memory distance to shift the tensionless device from the tensionless state to the release state in which the tensionless device is released to allow rewind of the belt.

34. A method in accordance with claim 33 including the further step of:

operating the tensionless device by a door actuator from the tensionless state to the release state to rewind the belt.

35. A method of reducing the amount of slack between the occupant and a seat belt when a tensionless device on a seat belt retractor is shifted into a tensionless position to hold the belt against the force of the reel rewind spring, said method comprising the steps of:

moving a manual overt actuator by the occupant to shift a control member into an activated position in which the pawl is held from engagement with the ratchet wheel at a predetermined location, pulling of the belt when the device is in the activated position and dropping the pawl immediately to engage a first ratchet tooth to prevent belt rewind and establishing a reduction in slack between the belt and the occupant's body, extracting further belt beyond the pawl and ratchet engaging position to cause a cam to lift pawl from the ratchet wheel to allow belt protraction through a distance less than a predetermined memory distance, and dropping the pawl into reengagement with the first ratchet tooth upon release of the seat belt by the occupant whereby the tensionless device is in the tensionless position with a reduced amount of slack between the belt and the occupant's body.

36. A method in accordance with claim 35 in which the amount of slack is about one-half inch or less.

* * * * *